United States Patent
Kim

(10) Patent No.: US 10,717,374 B2
(45) Date of Patent: Jul. 21, 2020

(54) SEAT ROTATING DEVICE OF AUTONOMOUS VEHICLE

(71) Applicants: Hyundai Motor Company, Seoul (KR); Kia Motors Corporation, Seoul (KR)

(72) Inventor: Do Hoi Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 42 days.

(21) Appl. No.: 16/168,723

(22) Filed: Oct. 23, 2018

(65) Prior Publication Data

US 2020/0039392 A1 Feb. 6, 2020

(30) Foreign Application Priority Data

Aug. 6, 2018 (KR) .................. 10-2018-0091421

(51) Int. Cl.
*B60N 2/14* (2006.01)
*B60N 2/427* (2006.01)
*B60N 2/015* (2006.01)

(52) U.S. Cl.
CPC ............ *B60N 2/146* (2013.01); *B60N 2/015* (2013.01); *B60N 2/143* (2013.01); *B60N 2/42736* (2013.01)

(58) Field of Classification Search
CPC .......... B60N 2/146; B60N 2/143; B60N 2/14; B60N 2/015; B60N 2/42736; B60N 2/42; B60N 2/427; B60N 2/42727

USPC ............... 297/344.22, 344.21, 344.1
See application file for complete search history.

(56) References Cited

U.S. PATENT DOCUMENTS

| 6,024,398 | A | | 2/2000 | Horton et al. | |
|---|---|---|---|---|---|
| 6,027,170 | A | * | 2/2000 | Benz | B60N 2/14 248/425 |
| 6,457,765 | B1 | * | 10/2002 | Bergquist | B60N 2/01 296/64 |
| 7,036,883 | B1 | * | 5/2006 | Thompson | B60N 2/0224 297/344.24 |
| 7,677,629 | B2 | * | 3/2010 | Akiya | B60N 2/01 296/64 |
| 7,934,762 | B2 | | 5/2011 | Hollenbeck et al. | |
| 8,398,356 | B2 | | 3/2013 | Sandoz | |
| 10,040,373 | B2 | * | 8/2018 | Rawlinson | B60N 2/14 |
| 10,486,558 | B1 | * | 11/2019 | Baccouche | B60N 2/005 |
| 2003/0141736 | A1 | * | 7/2003 | Chernoff | B60N 2/01 296/65.01 |
| 2009/0195037 | A1 | * | 8/2009 | Plavetich | B60N 2/01 297/257 |
| 2010/0001169 | A1 | * | 1/2010 | Armo | B60N 2/06 248/636 |
| 2011/0260482 | A1 | * | 10/2011 | Bourgraf | A61G 3/0875 296/19 |

(Continued)

*Primary Examiner* — Mark R Wendell
(74) *Attorney, Agent, or Firm* — Mints Levin Cohn Ferris Glovsky and Popeo, P.C.; Peter F. Corless

(57) ABSTRACT

A seat rotating device of an autonomous vehicle is provided. The device includes a floor panel on which a plurality of members configuring load paths during a collision are formed. A rotating unit is rotatably installed on the floor panel while supporting a seat and integrally rotates with the seat, and connects the load paths with the members formed on the floor panel.

12 Claims, 5 Drawing Sheets

(56) References Cited

U.S. PATENT DOCUMENTS

| | | | |
|---|---|---|---|
| 2013/0193732 A1* | 8/2013 | Brand | B60N 2/14 297/344.21 |
| 2016/0152163 A1* | 6/2016 | Strasdat | B60R 7/04 296/64 |
| 2017/0182914 A1* | 6/2017 | Lonstein | B60N 2/2869 |
| 2018/0065585 A1* | 3/2018 | Jaradi | B60R 21/233 |
| 2019/0126787 A1* | 5/2019 | Line | B60N 2/06 |

* cited by examiner

SEAT ROTATING DEVICE OF AUTONOMOUS VEHICLE

CROSS REFERENCE TO RELATED APPLICATION

The present application claims priority to Korean Patent Application No. 10-2018-0091421, filed on Aug. 6, 2018, the entire contents of which is incorporated herein for all purposes by this reference.

BACKGROUND

1. Technical Field

The present disclosure relates to a seat rotating device of an autonomous vehicle, and more particularly, to a seat rotating device of an autonomous vehicle that rotates a front seat of an autonomous vehicle.

2. Description of the Related Art

In general, a driver seat and a passenger seat are provided as front seats of a vehicle and are fixed without a rotation function in right and left directions. As autonomous vehicles are developed, there is a reduced need to for a driver to continuously face forward and, accordingly, a seat should be capable of being directed backward, for example, when the driver communicates with another person who is on a rear seat.

A conventional vehicle seat has a tilting function of moving a back of chair back and forth, a lifting function of changing a height of a cushion, and a sliding function that moves an entire seat back and forth. In this regard, a lower end portion of the vehicle seat is fixedly installed to a member formed on a floor panel of the vehicle and, accordingly, a structure of a lower portion of the seat becomes excessively complex to insert an additional rotation structure into the lower end portion of the seat.

In addition, when a structure for supporting an entire seat with one column is employed to rotate the seat, problems are predicted to occur in that the column is broken when a collision occurs or load paths for transferring and distributing load generated by a collision are disconnected and impulse is concentrated on a seat. Accordingly, there has been a need for a new seat rotating device for rotating a seat while stably supporting the seat and for connecting load paths during a vehicle collision.

The contents described as the related art have been provided merely to assist in understanding the background of the present disclosure and should not be considered as corresponding to the related art known to those having ordinary skill in the art.

SUMMARY

An object of the present disclosure is to provide a seat rotating device of an autonomous vehicle, for rotating a driver seat and a passenger seat in an autonomous vehicle and connecting load paths during a vehicle collision.

According to an exemplary embodiment of the present disclosure, a seat rotating device of an autonomous vehicle may include a floor panel on which a plurality of members configuring load paths during a collision are formed, and a rotating unit rotatably installed on the floor panel while supporting a seat and integrally rotating with the seat, and connecting the load paths with the members formed on the floor panel.

An installation region for disconnecting the members may be formed in the floor panel as an empty space formed by removing a predetermining region, and the rotation unit may be inserted into and installed in the installation region to connect the load paths between the disconnected members. The rotation unit may include a seat base having a circular cylindrical shape and a lateral surface that is maintained during rotation. The lateral surface of the seat base may be formed adjacently to an end portion of the member, and the end portion of the member, adjacent to the seat base, may be concavely formed to correspond to the shape of the lateral surface of the seat base.

The rotation unit may further include a mounting base that is fixed to the floor panel, rotatably supports the seat base, and has a circular plate shape, and a bearing ball installed between the seat base and the mounting base to reduce friction between the seat base and the mounting base. Additionally, hemisphere-type ball containers that are concave in an upwards direction may be formed on a bottom surface of the seat base, a ring-type ball rail that is concave in a downward direction may be formed on an upper surface of the mounting base, and the bearing ball may be interposed between the ball containers and the ball rail and rotatably supports the seat base and the mounting base to be spaced apart from each other.

The seat base may further include a flange that protrudes downward on the lateral surface of the seat base. The mounting base may further include a coupling protrusion that protrudes from a lateral surface of the mounting base and is fixed to the floor panel, and the flange of the seat base may be caught by the coupling protrusion of the mounting base to limit a rotation angle of the seat base. A diameter of a mounting base may be less than that of an installation region. The coupling protrusion of the mounting base may be coupled to a bottom surface of the floor panel, and the flange of the seat base may protrude in a space between the floor panel and the mounting base and may be caught by the coupling protrusion of the mounting base.

The rotation unit may further include a restraint module that fixes the flange of the seat base to restrain a rotation position of the seat. The restraint module may include a locking bracket that is rotatably installed on a bottom surface of the mounting base and rotates while contacting the flange to fix the flange and the coupling protrusion when the flange and the coupling protrusion contact each other and the flange of the seat base contacts the coupling protrusion of the mounting base. The rotation unit may further include a release bracket that rotates the locking bracket to release the state in which the flange and the coupling protrusion contact each other, and an operation button that is connected to the release bracket and is operated to rotate the release bracket.

The locking bracket may be classified into a first contact portion that contacts a front side of the flange during rotation, a second contact portion contacts a rear side of the flange to maintain a state in which the flange contacts the coupling protrusion, and a third contact portion that contacts the release bracket and releases contact between the second contact portion and the flange. The first contact portion and the second contact portion may be formed with a U shape and, when the first contact portion contacts the flange and rotates to be pushed into the flange, the second contact portion may rotate toward the flange. The third contact portion may be formed on the second contact portion, and when the third contact portion contacts the release bracket, the second contact portion may rotate in a direction in which the second contact portion is separated from the flange.

The operation button may be installed adjacent to the seat of a vehicle to allow a passenger to manipulate the operation button. The flange of the seat base and the coupling protrusion of the mounting base may each be provided in a plural number. The seat rotating device may further include a plurality of ball containers formed on the seat base. The bearing balls may be provided in the same number of the number as the ball containers and are each inserted into and installed in one ball container. A contact groove that is concavely processed downward may be formed on an upper surface of the seat base, and the ball container may be formed on a bottom surface of the contact groove.

The member of the floor panel may include a first member formed like a long shape in a forward and backward directions of a vehicle and a second member formed like a long shape in right and left directions of the vehicle. The installation region of the floor panel may be formed to disconnect the first member and the second member, and the rotation unit may be inserted into and installed in the installation region to connect load paths between the first member and the second member.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
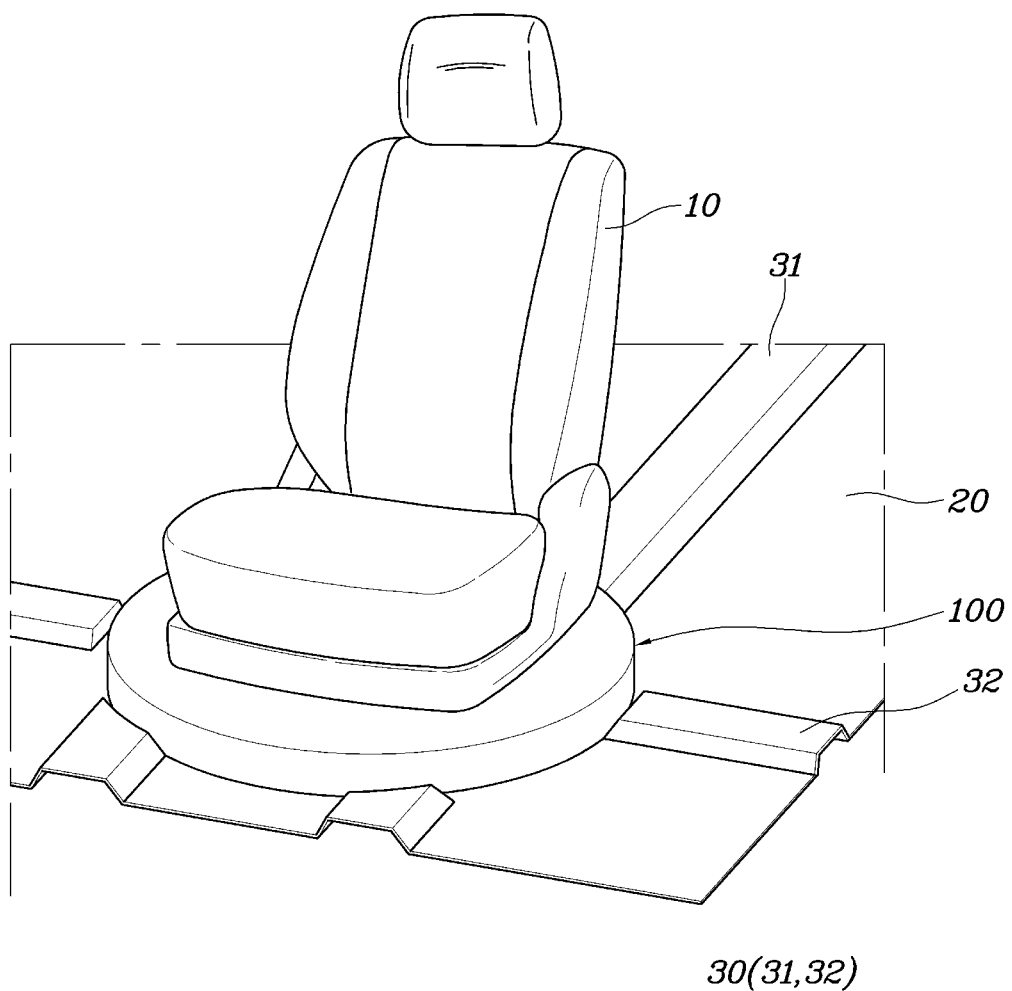
FIG. 1 is a diagram showing a seat installed on a seat rotating device of an autonomous vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The technical terms used in the present specification are used for explaining a specific exemplary embodiment, not limiting the present inventive concept. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a seat rotating device of an autonomous vehicle according to exemplary embodiments of the present disclosure is described with reference to the accompanying drawings.

Figure 2:
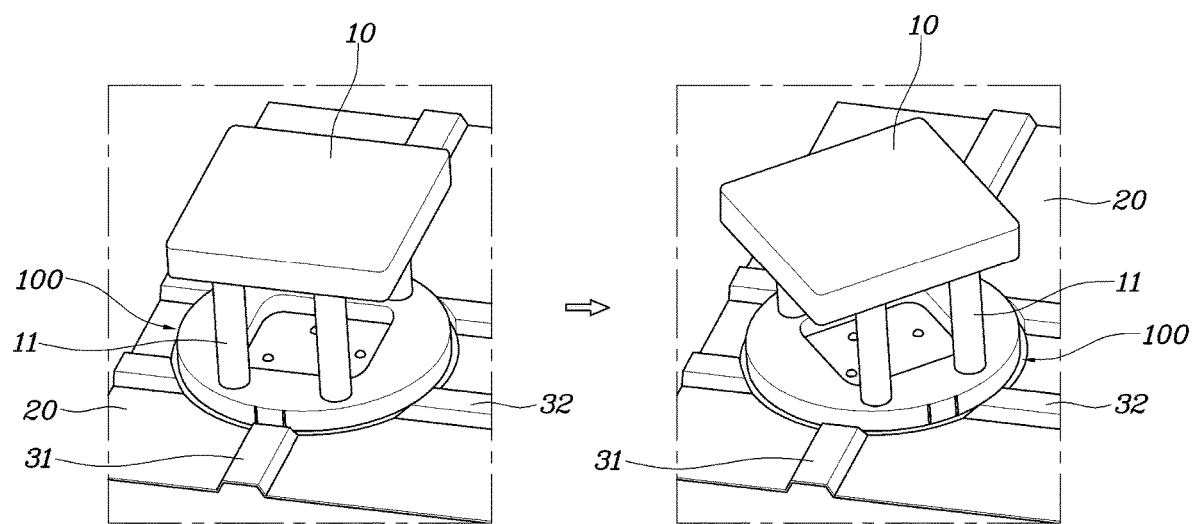
FIG. 2 is a diagram showing the seat rotating device of an autonomous vehicle rotating according to an exemplary embodiment of the present disclosure.
Figure 3:
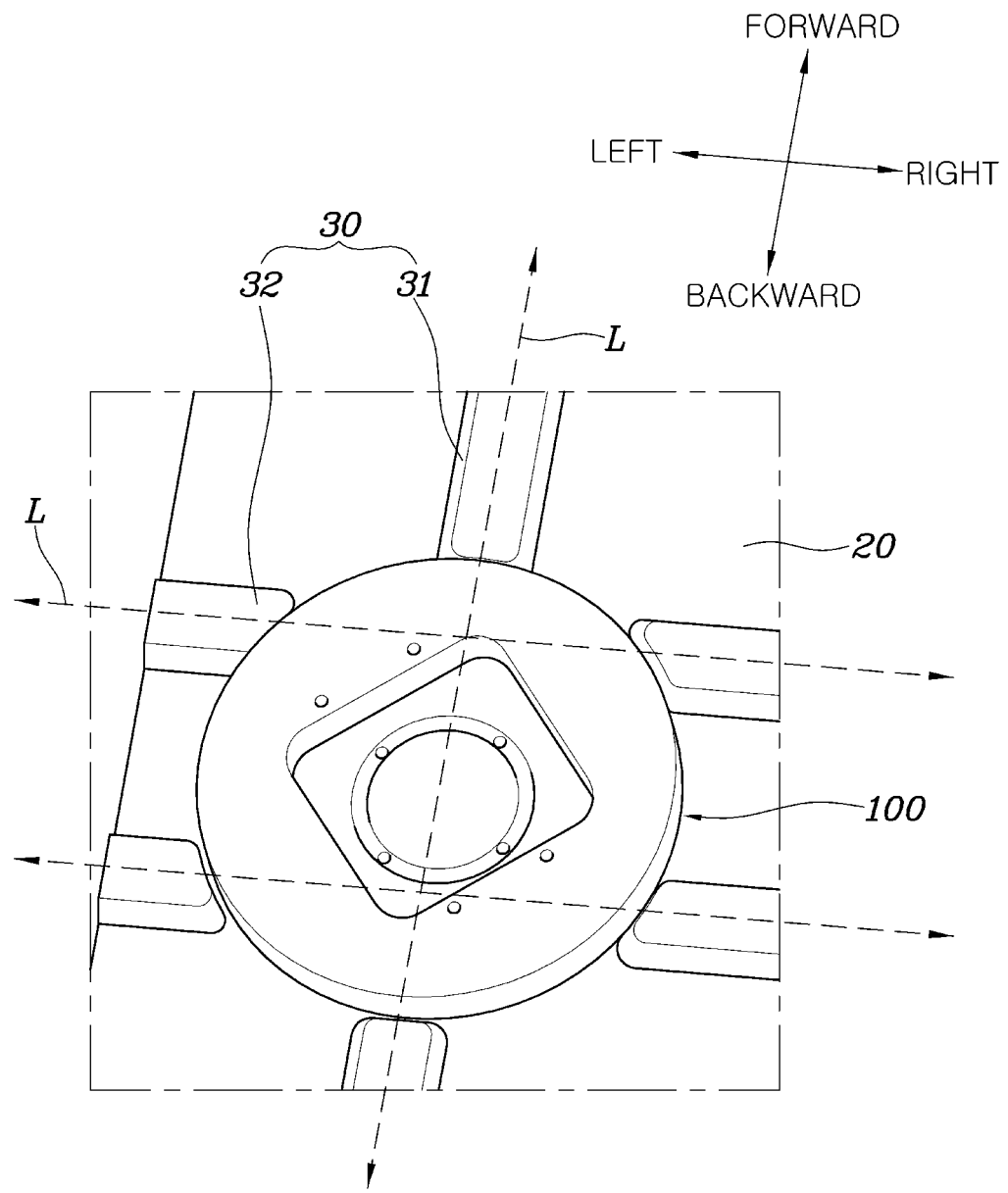
FIG. 3 is a diagram showing the seat rotating device of an autonomous vehicle connecting load paths according to an exemplary embodiment of the present disclosure.
Figure 4:
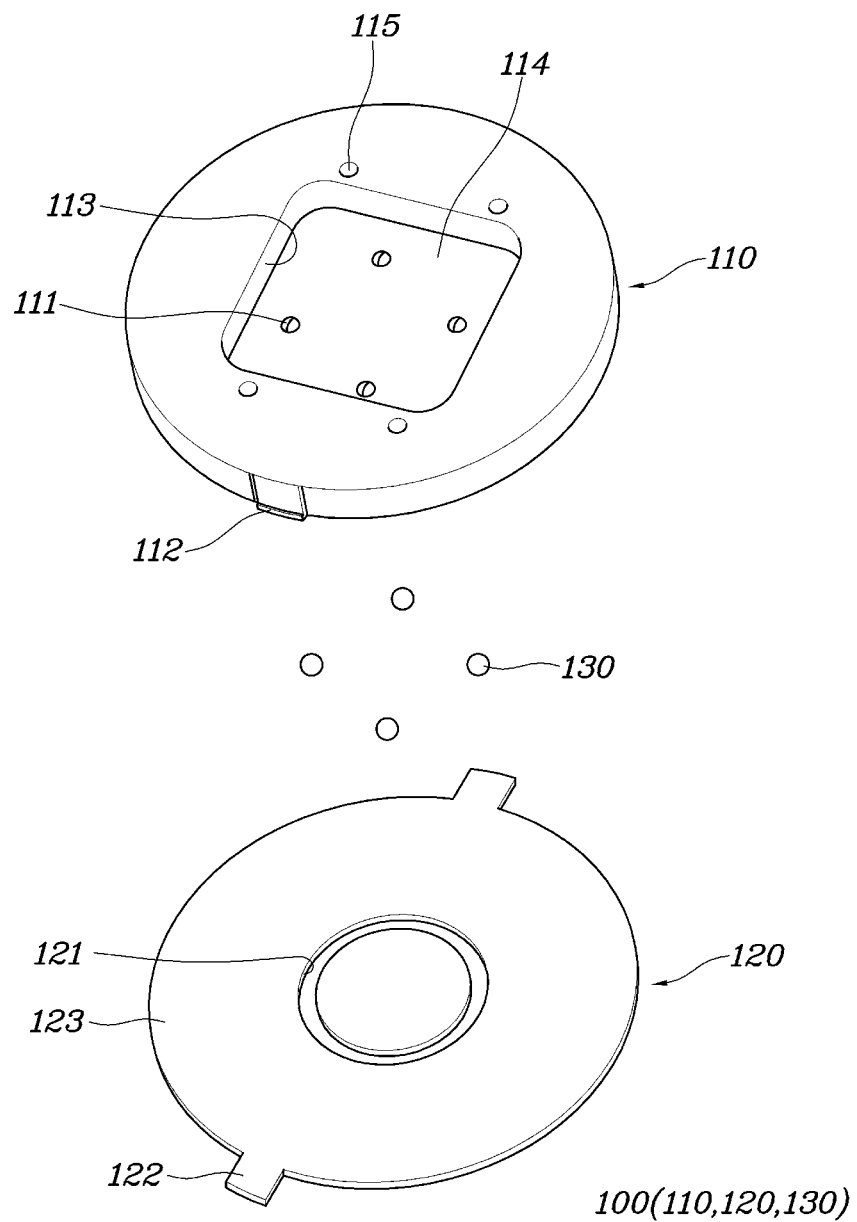
FIG. 4 is a detailed diagram showing a rotation unit of the seat rotating device of an autonomous vehicle according to an exemplary embodiment of the present disclosure.
Figure 5:
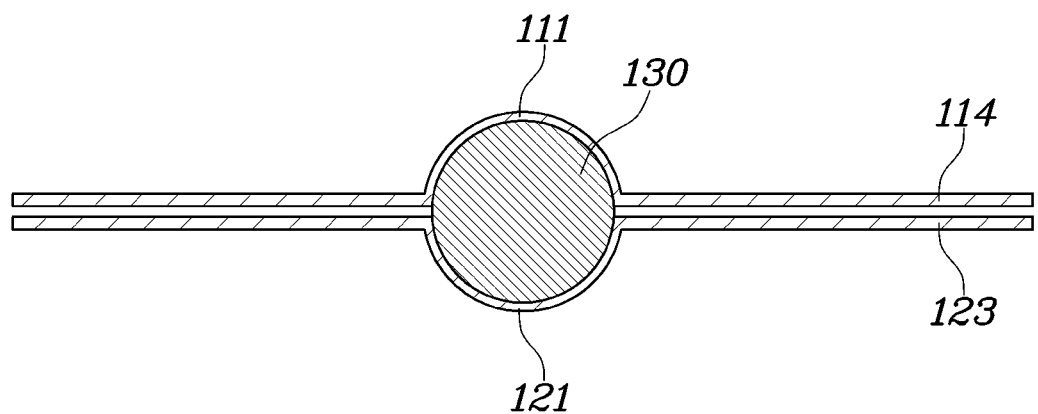
FIG. 5 is a diagram showing a bearing ball inserted into a rotation unit of the seat rotating device of an autonomous vehicle according to an exemplary embodiment of the present disclosure.
Figure 6:
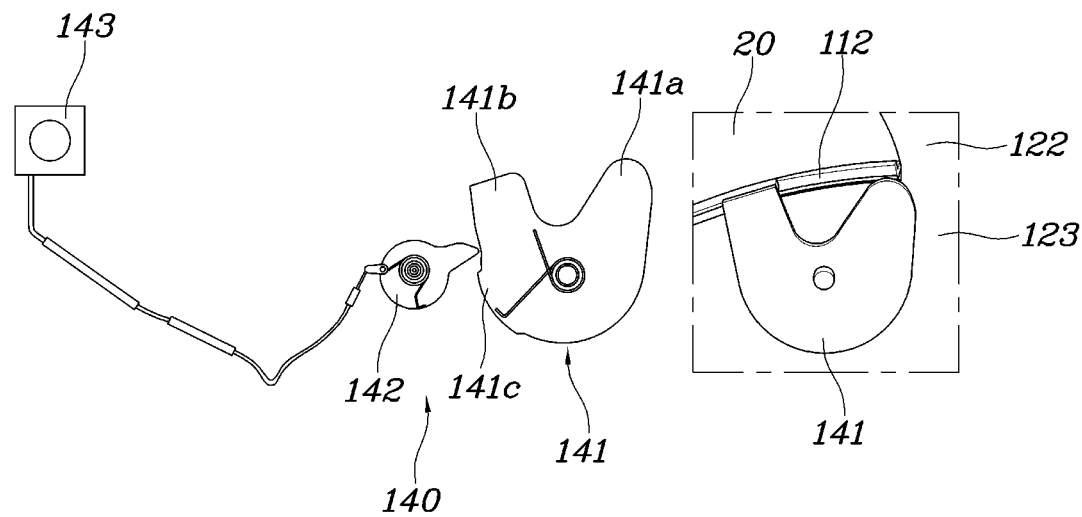
FIG. 6 is a diagram showing a configuration of fixing a position of a rotation unit of the seat rotating device of an autonomous vehicle according to an exemplary embodiment of the present disclosure.

FIG. 1 is a diagram showing a seat installed on a seat rotating device of an autonomous vehicle according to an exemplary embodiment of the present disclosure. FIG. 2 is a diagram showing the seat rotating device of an autonomous vehicle rotating according to an exemplary embodiment of the present disclosure. FIG. 3 is the seat rotating device of an autonomous vehicle connecting load paths according to an exemplary embodiment of the present disclosure. FIG. 4 is a diagram showing a rotation unit of the seat rotating device of an autonomous vehicle according to an exemplary embodiment of the present disclosure. FIG. 5 is a diagram showing a bearing ball inserted into a rotation unit of the seat rotating device of an autonomous vehicle according to an exemplary embodiment of the present disclosure. FIG. 6 is a diagram showing a configuration of fixing a position of a rotation unit of the seat rotating device of an autonomous vehicle according to an exemplary embodiment of the present disclosure.

As shown in FIGS. 1 to 6, the seat rotating device of an autonomous vehicle according to the present disclosure may include a floor panel 20 on which a plurality of members configuring load paths during a collision are formed, and a rotation unit 100 rotatably installed on the floor panel 20 while supporting a seat 10 and configured to integrally rotate with the seat 10 and configures load paths L connected along with a member 30 formed on the floor panel 20.

The floor panel 20 may be similar to a general floor panel that is conventionally used, but may be different in that a circular aperture for installation of the rotation unit 100 according to the present disclosure is formed. The circular aperture may be referred to as an installation region. The installation region may be provided to cut a central portion of the members 30 including a first member 31 that is formed in a long shape in forward and backward directions of a vehicle (e.g., formed to extend in the length direction of the vehicle) and a second member 32 formed in a long shape in right and left directions of the vehicle (e.g., formed to extend in the width direction of the vehicle) and, in this case, the members 30 may form the load paths L to which load may be transferred during the collision and, thus, the load paths L may be disconnected in the installation region.

The rotation unit 100 may be rotatably installed on the floor panel 20 to support the seat 10 and, in particular, and may be installed and inserted into the installation region to connect the load paths L formed on the member 30. The member 30 of the floor panel 20 and the rotation unit 100 may not directly contact each other but, when load is transferred to the floor panel 20 through the member 30 when a collision occurs, the member 30 and the rotation unit 100 may contact each other to connect the load paths L to which load is transferred while the floor panel 20 is deformed.

The rotation unit 100 may include a seat base 110, a mounting base 120, a bearing ball 130, and a restraint module 140. The seat base 110 may include the seat 10 fixed to an upper side thereof and may have a lateral surface shaped in a circular cylinder adjacent to the member 30. In particular, an end portion of the member 30 may be concavely formed in an arc shape to correspond to a shape of a lateral surface of the seat base 110. Accordingly, load may be more smoothly transferred while the seat base 110 and the member 30 are adhered to each other when the collision occurs, thereby connecting the load paths L. Coupling apertures 115 may be formed on an upper surface of the seat base 110 and coupling members 11 of the seat 10 may be fixed to the coupling apertures 115 to couple the seat 10 and the seat base 110 to each other. A more detailed shape of the seat base 110 and a description thereof are described after a description of the mounting base 120.

The mounting base 120 may be fixed to the floor panel 20 and rotatably supports the seat base 110. A ring-type ball rail 121 that is concave in a downward direction may be formed on an upper surface of the mounting base 120 and hemisphere-type ball containers 111 that are concave in an upward direction may be formed on a lower surface of the seat base 110. Thus, a portion of the bearing ball 130, which corresponds to an upper portion of the hemisphere, may be accommodated in the ball container 111 to fix a position of the bearing ball 130 and a portion of the bearing ball 130, which corresponds to a lower portion of the hemisphere, may be inserted into the ball rail 121.

As a result, the bearing balls 130 may support the mounting base 120 and the seat base 110 therebetween and, thus, the seat base 110 may be configured to rotate on the mounting base 120. In particular, the plurality of bearing balls 130 may be radially provided to distribute load of the seat base 110 and to uniformly transfer the load to the mounting base 120. In other words, the plurality of ball containers 111 may be radially arranged on a virtual circle with a constant diameter with respect to a rotation axis of the seat base 110 and the mounting base 120 and the ball rail 121 may be formed in a circle with a constant diameter with respect to a rotation axis of the seat base 110 and the mounting base 120. Accordingly, the plurality of bearing balls 130 may be arranged at a predetermined interval. Additionally, an upper surface of the mounting base 120 and a lower surface of the seat base 110 may be maintained to be spaced apart from each other and, thus, may be indirectly connected by the bearing ball 130 to minimize friction between the mounting base 120 and the seat base 110.

According to an exemplary embodiment of the present disclosure, four bearing balls 130 and four ball containers 111 may be supported to be spaced apart from each other by about 90° but, for example, a support structure may be changed in various ways, that is, three bearing balls and three ball containers may be spaced apart from each other by about 120° or six bearing balls and six ball containers may be spaced apart from each other by about 60°. A contact groove 113 concavely processed downward may be formed on an upper surface of the seat base 110 and the plurality of ball containers 111 may be convexly formed upward on a bottom surface 114 of the contact groove 113. The contact groove 113 may move a position at which the plurality of ball containers 111 are formed, downward to a maximum degree to enhance stability, and an operating member (not shown) or the like for tilting, lifting, and sliding operations of the seat 10 may be installed in a space provided through the contact groove 113.

The seat base 110 may further include a flange 112 that protrudes downward on a lateral surface thereof. The mounting base 120 may further include a coupling protrusion 122 that protrudes from a lateral surface and is fixed to a floor panel, and the flange 112 of the seat base 110 may be caught by the coupling protrusion 122 to limit a rotation angle of the seat base 110. In particular, the coupling protrusion 122 of the mounting base 120 may be welded and coupled to the floor panel 20 and, thus, the mounting base 120 may be fixed to the floor panel 20 to support the seat base 110 and the seat 10. However, the connection is not limited to welding, and other connection methods may be used.

A base panel 123 shaped as a circle of the mounting base 120 may be formed with a smaller diameter than an installation region. The coupling protrusion 122 of the mounting base 120 may be coupled to a bottom surface of the floor panel 20 and the flange 112 of the seat base 110 may protrude in a space between the floor panel 20 and the base panel 123 of the mounting base 120 to be caught by the coupling protrusion 122 of the mounting base 120. In other words, when the seat base 110 rotates on the mounting base 120, the flange 112 protruding downward from the seat base 110 may protrude from the mounting base 120 and may contact the coupling protrusion 122 coupled to the floor panel 20, thereby limiting a rotation angle of the seat base 110.

The flange 112 of the seat base 110 and the coupling protrusion 122 of the mounting base 120 may each be provided in a plural number and, in this regard, a minimum of two coupling protrusions 122 may be formed to fix the mounting base 120 to the floor panel 20 and the flange 112 may be provided in the same number as the number of the coupling protrusions 122 to contact each of the coupling protrusions 122.

According to an exemplary embodiment of the present disclosure, a pair of coupling protrusions 122 may be provided and spaced apart from each other by about 180° to rotate the seat base 110 by about 150°, but three coupling protrusions 122 may be spaced apart from each other by about 120° to limit a rotation angle to about 100° or two coupling protrusions 122 may be spaced apart from each other by an angle greater than about 180° to permit a rotation angle of the seat base 110 to exceed 180°.

The restraint module 140 may be installed to maintain a state in which the flange 112 contacts the coupling protrusion 122 and may include a locking bracket 141 rotatably installed on the bottom surface of the mounting base 120 and configured to rotate while contacting the flange 112 to fix the flange 112 and the coupling protrusion 122 when the flange 112 and the coupling protrusion 122 contact each other and the flange 112 of the seat base 110 contacts the coupling protrusion 122 of the mounting base 120. The restraint module 140 may further include a release bracket 142 configured to rotate the locking bracket 141 to release the state in which the flange 112 and the coupling protrusion 122 contact each other, and an operation button 143 connected to the release bracket and operated to rotate the release bracket.

The locking bracket 141 may be classified into a first contact portion 141a that contacts a front side of the flange 112 during rotation, a second contact portion 141b that contacts a rear side of the flange 112 to maintain a state in which the flange 112 contacts the coupling protrusion 122, and a third contact portion 141c that contacts the release bracket 142 and releases contact between the second contact portion 141b and the flange. Additionally, the first contact portion 141a and the second contact portion 141b may be formed with a U shape and, thus, when the first contact portion 141a contacts the flange 112 and rotates to be pushed into the flange 112, the second contact portion 141b may be configured to rotate toward the flange 112. The third contact portion 141c may be formed on the second contact portion 141b and, when the third contact portion 141c contacts the release bracket 142, the second contact portion 141b may be configured to rotate in a direction in which the second contact portion 141b is separated from the flange 112. The operation button 143 may be installed adjacent to the seat 10 of a vehicle to allow a passenger to manipulate the operation button 143. For example, the operation button 143 may be installed adjacent to a dashboard of the driver seat to receive user manipulation.

As described above, a seat rotating device of an autonomous vehicle according to the present disclosure may have the following effect.

First, a seat rotating device for rotating a front seat of the autonomous vehicle backward may be provided.

Second, load paths may be formed during a collision irrespective of a rotation angle of a front seat and, thus, transfer and distribution of collision load may be performed more easily.

Third, the seat rotating device may be prevented from interfering with an operating member for tilting, lifting, sliding, and so on of the seat.

Fourth, the seat may be fixed to be maintained in a rotated state.

Although the present disclosure has been shown and described with respect to specific embodiments, it will be apparent to those having ordinary skill in the art that the present disclosure may be variously modified and altered without departing from the spirit and scope of the present disclosure. Accordingly, the aforementioned embodiments are exemplary in all aspects and are understood not to be limited. The scope of the present disclosure is defined by the following claims but not the above description and the meaning and scope of the claims and all modifications or modified forms from equivalents thereof are within the scope of the present disclosure.

What is claimed is:

1. A seat rotating device of an autonomous vehicle, comprising:
   a floor panel on which a plurality of members configuring load paths during a collision are formed; and
   a rotating unit rotatably installed on the floor panel while supporting a seat and integrally rotating with the seat, and connecting the load paths with the members formed on the floor panel,
   wherein an installation region for disconnecting the members is formed in the floor panel as an empty space formed by removing a predetermining region, and
   wherein the rotation unit is inserted into and installed in the installation region to connect the load paths between the disconnected members.

2. The seat rotating device of claim 1, wherein the rotation unit includes:
   a seat base shaped as a circular cylinder and having a lateral surface that maintains a shape thereof during rotation,
   wherein the lateral surface of the seat base is formed adjacent to an end portion of the member, and
   wherein the end portion of the member, adjacent to the seat base, is concavely formed to correspond to the shape of the lateral surface of the seat base.

3. The seat rotating device of claim 2, wherein the rotation unit further includes:
   a mounting base that is fixed to the floor panel, rotatably supports the seat base, and has a circular plate shape; and
   a bearing ball installed between the seat base and the mounting base to reduce friction between the seat base and the mounting base,
   wherein hemisphere-type ball containers that are concave in an upward direction are formed on a bottom surface of the seat base, a ring-type ball rail that is concave in a downward direction is formed on an upper surface of the mounting base, and the bearing ball is interposed between the ball containers and the ball rail and rotatably supports the seat base and the mounting base to be spaced apart from each other.

4. The seat rotating device of claim 3, wherein the seat base further includes:
   a flange that protrudes downward on the lateral surface of the seat base,
   wherein the mounting base further includes a coupling protrusion that protrudes from a lateral surface of the mounting base and is fixed to the floor panel, and
   wherein the flange of the seat base is caught by the coupling protrusion of the mounting base to limit a rotation angle of the seat base.

5. The seat rotating device of claim 4, wherein a diameter of a mounting base is smaller than that of an installation region, and wherein the coupling protrusion of the mounting base is coupled to a bottom surface of the floor panel, and the flange of the seat base protrudes in a space between the floor panel and the mounting base and is caught by the coupling protrusion of the mounting base.

6. The seat rotating device of claim 4, wherein the rotation unit further includes:
   a restraint module that fixes the flange of the seat base to restrain a rotation position of the seat,
   wherein the restraint module includes:

a locking bracket that is rotatably installed on a bottom surface of the mounting base and rotates while contacting the flange to fix the flange and the coupling protrusion in a state in which the flange and the coupling protrusion contact each other when the flange of the seat base contacts the coupling protrusion of the mounting base;

a release bracket that rotates the locking bracket to release the state in which the flange and the coupling protrusion contact each other; and an operation button connected to the release bracket and operated to rotate the release bracket.

7. The seat rotating device of claim 6, wherein the locking bracket is classified into:

a first contact portion that contacts a front side of the flange during rotation;

a second contact portion contacts a rear side of the flange to maintain a state in which the flange contacts the coupling protrusion; and a third contact portion that contacts the release bracket and releases contact between the second contact portion and the flange, wherein the first contact portion and the second contact portion are formed with a U shape and, when the first contact portion contacts the flange and rotates to be pushed into the flange, the second contact portion rotates toward the flange, and wherein the third contact portion is formed on the second contact portion, and when the third contact portion contacts the release bracket, the second contact portion rotates in a direction in which the second contact portion is separated from the flange.

8. The seat rotating device of claim 6, wherein the operation button is installed adjacent to the seat of a vehicle to allow a passenger to manipulate the operation button.

9. The seat rotating device of claim 4, wherein the flange of the seat base and the coupling protrusion of the mounting base are each provided in a plural number.

10. The seat rotating device of claim 3, further comprising a plurality of ball containers formed on the seat base, wherein the bearing balls are provided in the same number as the number of the ball containers and are each inserted into and installed in one ball container.

11. The seat rotating device of claim 3, wherein a contact groove that is concavely processed downward is formed on an upper surface of the seat base and wherein the ball container is formed on a bottom surface of the contact groove.

12. The seat rotating device of claim 11, wherein the member of the floor panel includes:

a first member formed to extend in a length direction of a vehicle and a second member formed to extend in a width direction of the vehicle, wherein the installation region of the floor panel is formed to disconnect the first member and the second member, and wherein the rotation unit is inserted into and installed in the installation region to connect load paths between the first member and the second member.

* * * * *